United States Patent [19]

Hashimoto

[11] Patent Number: 5,768,042
[45] Date of Patent: Jun. 16, 1998

[54] MAGNETIC RECORDING AND REPRODUCING APPARATUS AND METHOD OF CALCULATING A RELATIVE TIME THEREIN

[75] Inventor: Atsushi Hashimoto, Hirakata, Japan

[73] Assignee: Matsushita Electric Industrial Co., Ltd., Kodoma, Japan

[21] Appl. No.: 703,555

[22] Filed: Aug. 27, 1996

[30] Foreign Application Priority Data

Aug. 31, 1995 [JP] Japan ................................ 7-223308

[51] Int. Cl.$^6$ ................................................. G11B 15/18
[52] U.S. Cl. ................................................. 360/72.2
[58] Field of Search ........................ 360/72.02, 71, 360/72.1, 69; 369/32

[56] References Cited

U.S. PATENT DOCUMENTS 4,340,916  7/1982  Menezes .............................. 360/72.2
4,701,898  10/1987  Giddings ............................. 360/72.2
4,953,040  8/1990  Hedtke et al. ...................... 360/72.2

FOREIGN PATENT DOCUMENTS

58-150182  9/1983  Japan.

Primary Examiner—Nabil Hindi
Attorney, Agent, or Firm—Panitch Schwarze Jacobs & Nadel, PC

[57] ABSTRACT

A magnetic recording and reproducing apparatus having a time code detecting block (16) for detecting and issuing a time code, a reset position memory (18) for storing the time code at a reset position, a previous time code memory (20) for storing the time code, a relative time memory (21) for storing a relative time, and a calculation block (19) for calculating a present relative time based upon the time code issued from the time code detecting block, the time code stored in the reset position memory, the time code stored in the previous time code memory, and the relative time stored in the relative time memory.

2 Claims, 6 Drawing Sheets

MAGNETIC RECORDING AND REPRODUCING APPARATUS AND METHOD OF CALCULATING A RELATIVE TIME THEREIN

FIELD OF THE INVENTION AND RELATED ART STATEMENT

1. Field of the Invention

This invention relates to a magnetic recording and reproducing apparatus, and a method of calculating a relative time therein.

2. Description of the Related Art Statement

Recently, a magnetic recording and reproducing apparatus is required to record and reproduce not only a video signal and/or an audio signal but also a time code. The time code designates a continuously recording time on a magnetic recording medium such as a video tape, and is used for obtaining a relative time between a reset position and a present running position of the magnetic recording medium.

The conventional recording and reproducing apparatus will be explained with reference to FIG. 4.

Figure 4:
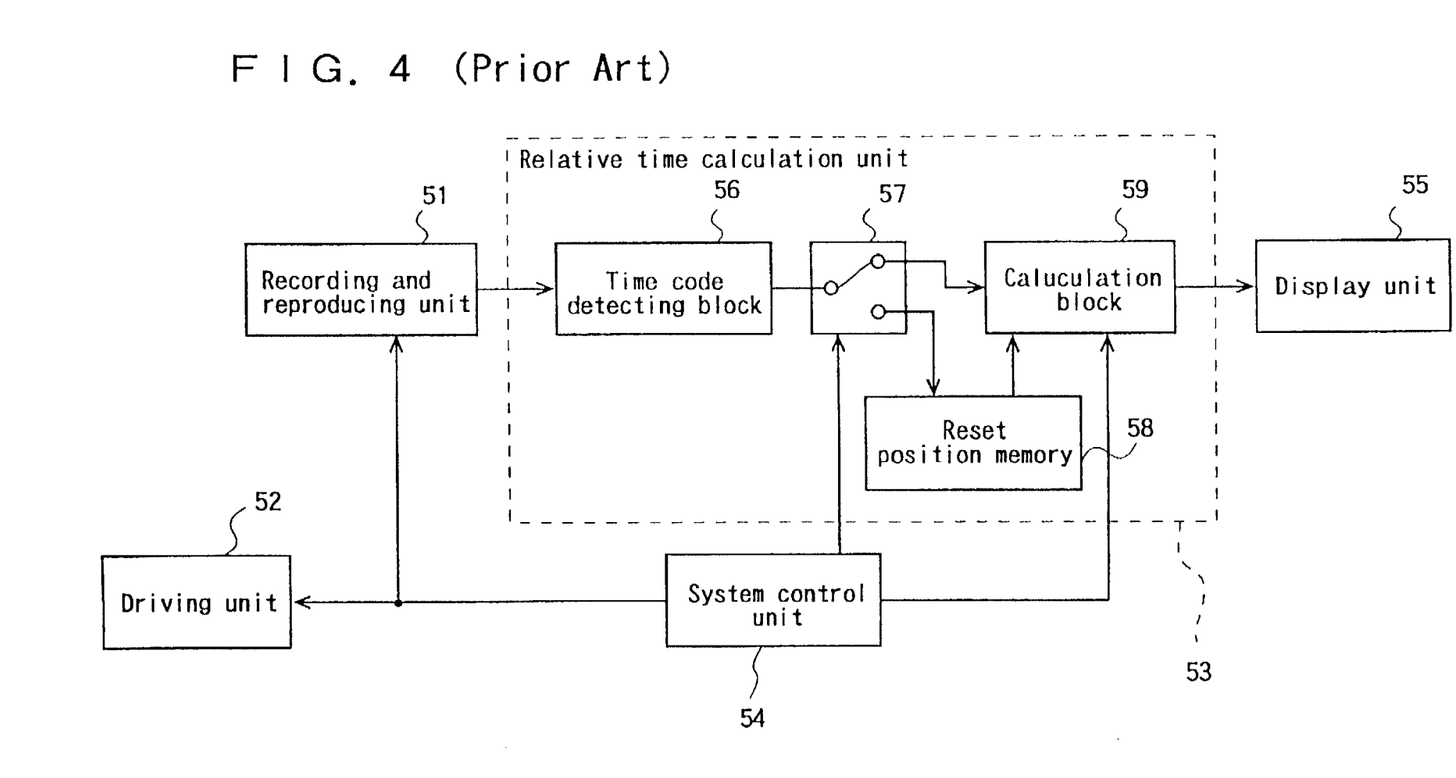
FIG. 4 is a block diagram showing a conventional magnetic recording and reproducing apparatus.

FIG. 4 is a block diagram showing a conventional magnetic recording and reproducing apparatus.

In FIG. 4, the conventional magnetic recording and reproducing apparatus comprises a recording and reproducing unit 51 having a magnetic head (not shown), a driving unit 52 for driving a magnetic recording medium (not shown), and a relative time calculation unit 53 connected with the recording and reproducing unit 51. Furthermore, the conventional magnetic recording and reproducing apparatus includes a system control unit 54 for controlling the recording and reproducing unit 51, the driving unit 52, and the relative time calculation unit 53, and a display unit 55 for indicating the relative time calculated by the relative time calculation unit 53.

The recording and reproducing unit 51 records recording signals to the magnetic recording medium, and reproduces reproduced signals from the magnetic recording medium. The recording signals and the reproduced signals include the video signal, the audio signal, and/or the time code. Furthermore, the recording and reproducing unit 51 outputs the reproduced signals to the relative time calculation unit 53. In accordance with demands of an operator such as an user, the recording and reproducing unit 51 and the driving unit 52 are controlled by the system control block 54.

The relative time calculation unit 53 consists of a time code detecting block 56 connected with the recording and reproducing unit 51, a switching block 57 connected with the time code detecting block 56, a reset position memory 58 for storing a time code at the reset position, and a calculation block 59 for calculating the relative time. The time code detecting block 56 detects the time code which is included in the reproduced signals issued from the recording and reproducing unit 51. The switching block 57 is controlled by a first switching signal and a second switching signal issued from the system control unit 54. That is, when the switching block 57 inputs the first switching signal, the switching block 57 switches the time code issued by the time code detecting block 56 from the calculation block 59 to the reset position memory 58. Thereby, the time code is memorized in the reset position memory 58 as a standard time TC0 of the relative time. When the switching block 57 inputs the second switching signal, the switching block 57 switches the time code issued by the time code detecting block 56 from the reset position memory 58 to the calculation block 59. Thereby, the time code is issued to the calculation block 59 as a present time TC1 corresponding to the present running position. The system control unit 54 outputs the first switching signal in the following cases (1) and (2), so that the relative time is reset to a predetermined value, for example, "00:00:00" in the display unit 55.

(1) The operator pushes a reset button (not shown) for resetting the relative time.

(2) The operator sets the magnetic recording medium to the conventional magnetic recording and reproducing apparatus newly.

The calculation block 59 calculates the relative time based upon the standard time TC0 and the present time TC1 in accordance with a demand signal issued from the system control block 54. Furthermore, the calculation block 59 outputs the relative time to the display unit 55. Thereby, the relative time is indicated by the display unit 55.

A method of calculating the relative time in the conventional recording and reproducing apparatus will be explained with reference to FIG. 5.

Figure 5:
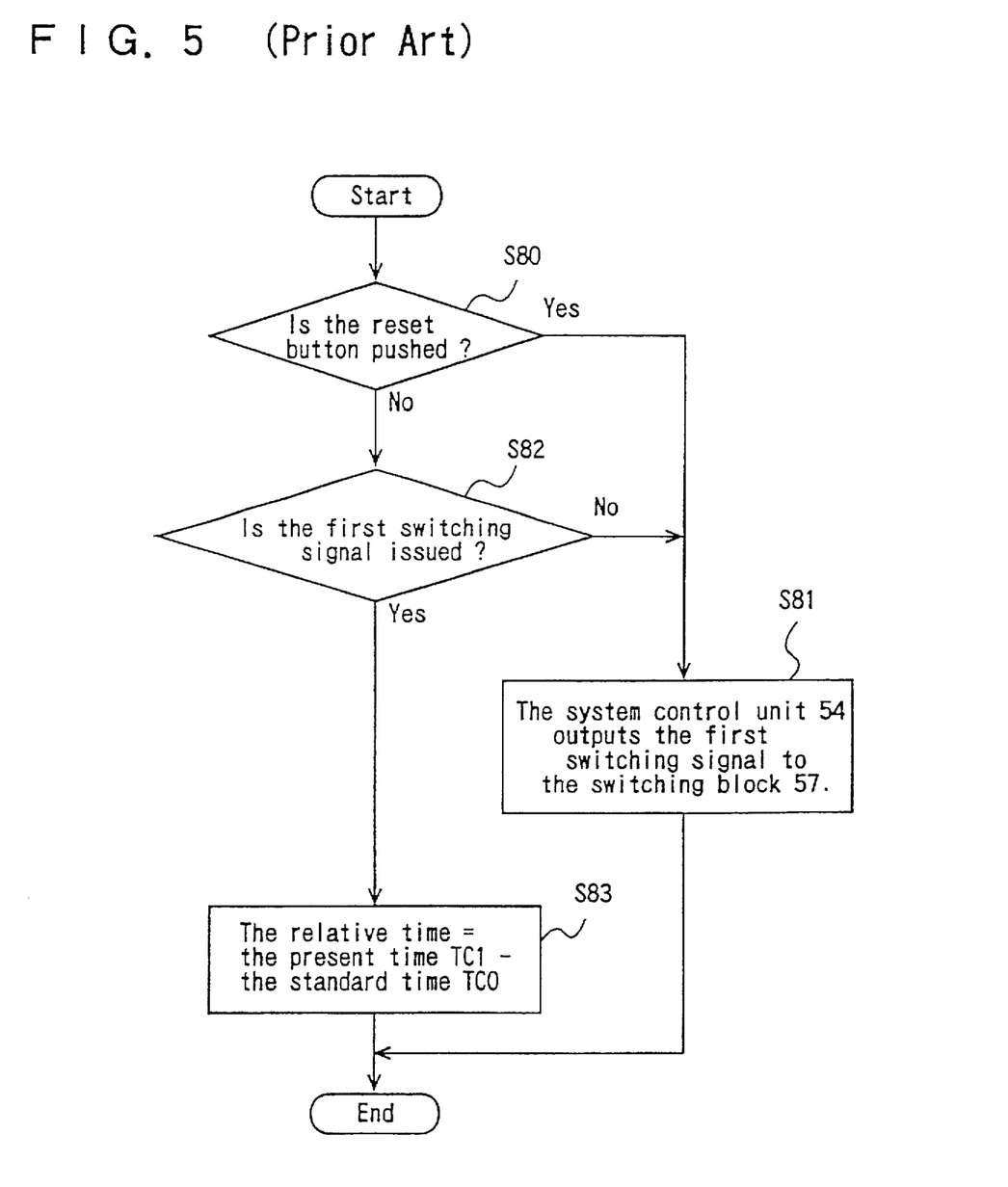
FIG. 5 is a flowchart diagram showing a method of calculating a relative time based upon a time code in the conventional magnetic recording and reproducing apparatus.

FIG. 5 is a flowchart diagram showing a method of calculating a relative time based upon a time code in the conventional magnetic recording and reproducing apparatus.

In a step S80, the system control unit 54 (FIG. 4) checks whether the reset button is pushed by the operator. In the case that the reset button is pushed by the operator, the system control unit 54 outputs the first switching signal to the switching block 57 (FIG. 4) as shown in a step S81. Thereby, the reset position memory 58 (FIG. 4) is connected with the time code detecting block 56 (FIG. 4) through the switching block 57, and the time code issued from the time code detecting block 56 is stored in the reset position memory 58 as the standard time TC0.

In the case that the reset button is not pushed by the operator, the system control unit 54 checks whether the first switching signal is issued to the switching block 57 as shown in a step S82. In the case that the first switching signal is not issued to the switching block 57, the system control unit 54 judges that the operator newly sets the magnetic recording medium to the conventional magnetic recording and reproducing apparatus. Thereby, the system control unit 54 performs the operation shown in the above-mentioned step S81.

In the case that the first switching signal is issued to the switching block 57, the system control unit 54 judges that the magnetic recording medium is driven by the driving unit 52 (FIG. 4), and the standard time TC0 is stored in the reset position memory 58. Thereby, the system control unit 54 outputs the second signal to the switching block 57. As a result, the time code detecting block 56 is connected with the calculation block 59 through the switching block 57, and the time code is output to the calculation block 59 as the present time TC1. Thereafter, in accordance with the demand signal issued from the system control unit 54, the calculation block 59 calculates the relative time by means of subtracting the standard time TC0 from the present time TC1 as shown in a step S83. Furthermore, the calculation block 59 outputs the calculated value to the display unit 55 as the relative time.

The operation of the conventional magnetic recording and reproducing apparatus will be explained with reference to FIG. 6A and FIG. 6B concretely.

Figure 6A:
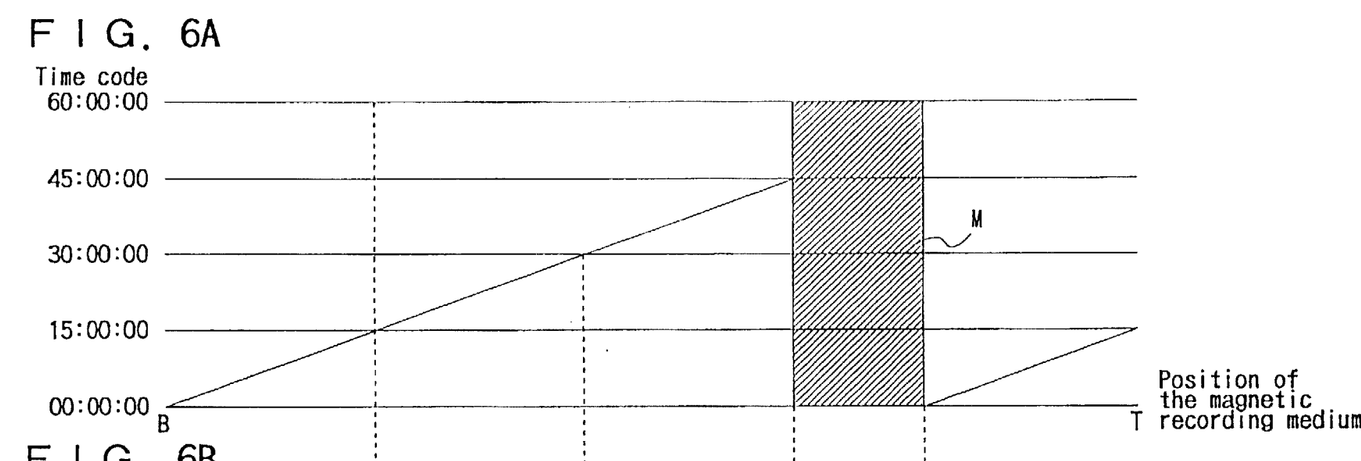
FIG. 6A is a time chart showing a relation between the time code and a position of the magnetic recording medium in the conventional magnetic recording and reproducing apparatus.

FIG. 6A is a time chart showing a relation between the time code and a position of the magnetic recording medium in the conventional magnetic recording and reproducing apparatus. FIG. 6B is a time chart showing a relation between the relative time and the position of the magnetic recording medium in the conventional magnetic recording and reproducing apparatus. In FIG. 6A, the abscissa is graduated with a position of the magnetic recording medium, and the ordinate is graduated with the time code. In FIG. 6B, the abscissa is graduated with a position of the magnetic recording medium, and the ordinate is graduated with the relative time. In the respective abscissas of FIGS. 6A and 6B, a point "B" designates a beginning end of the magnetic recording medium, and a point "T" designates a terminal end of the magnetic recording medium. In FIGS. 6A and 6B, a shaded portion "M" designates a non-recording part of the magnetic recording medium. FIG. 6A and FIG. 6B are drawn with their timing positions (represented by vertical broken lines) in agreement with each other.

Figure 6B:
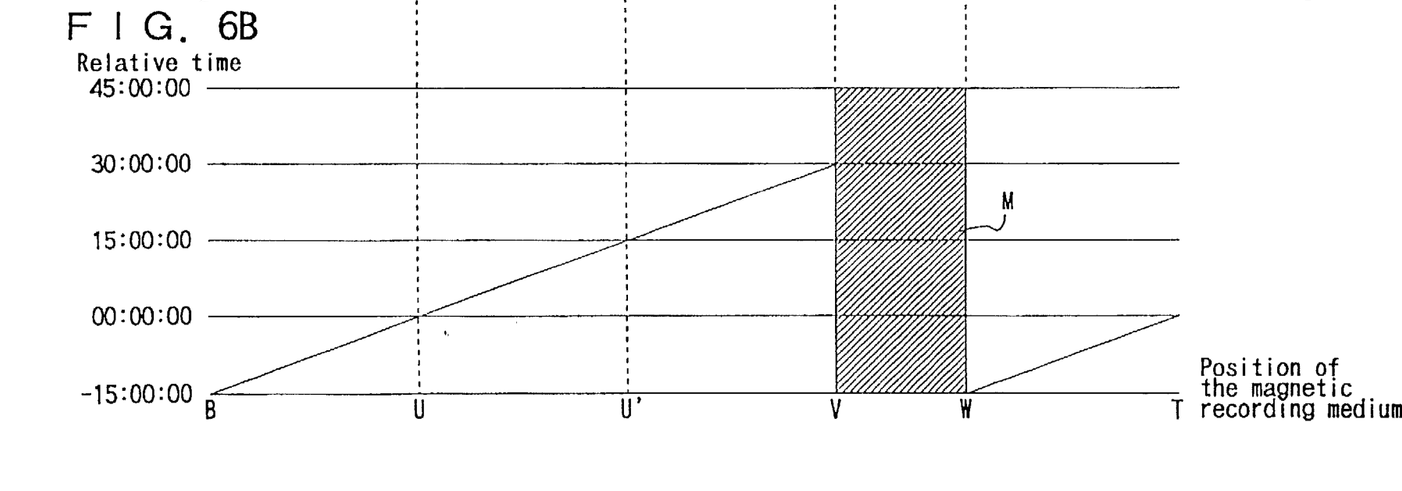
FIG. 6B is a time chart showing a relation between the relative time and the position of the magnetic recording medium in the conventional magnetic recording and reproducing apparatus.

For example, in FIGS. 6A and 6B, when the first switching signal is issued from the system control unit 54 (FIG. 4) to the switching block 57 (FIG. 4) at a point "U", the time code "15:00:00" is memorized in the reset position memory 58 (FIG. 4) as the standard time TC0. In the above-mentioned state, when the position of the magnetic recording medium exists in a point "U", the time code "30:00:00" outputs from the time code detecting block 56 (FIG. 4) to the calculation block 59 (FIG. 4) as the present time TC1. As a result, the calculation block 59 calculates the relative time as follows;

30:00:00−15:00:00=15:00:00.

Furthermore, in the above-mentioned state, when the position of the magnetic recording medium exists in a point "B", the time code "00:00:00" outputs from the time code detecting block 56 to the calculation block 59 as the present time TC1. As a result, the calculation block 59 calculates the relative time as follows;

00:00:00−15:00:00=−15:00:00.

Thus, in the conventional magnetic recording and reproducing apparatus, the standard time TC0 is memorized in the reset position memory 58, and the calculation block 59 subtracts the standard time TC0 from the present time TC1. Thereby, the calculation block 59 calculates the relative time.

However, in the conventional recording and reproducing apparatus, in the case that the non-recording part shown by a shaded portion "M" of FIGS. 6A and 6B exists in the magnetic recording medium, the time code loses it's continuity. Thereby, the relative time takes a discontinuous value before and after the non-recording part. As a result, there is a problem that the relative time becomes a meaningless value.

For example, in the aforementioned state that the time code "15:00:00" is memorized in the reset position memory 58 as the standard time TC0, when the position of the magnetic recording medium exists in a point "V", the time code "45:00:00" outputs from the time code detecting block 56 to the calculation block 59 as the present time TC1. As a result, the calculation block 59 calculates the relative time as follows;

45:00:00−15:00:00=30:00:00.

Contrary to the above-mentioned relative time "30:00:00", when the position of the magnetic recording medium exists in a point "W", the time code "00:00:00" outputs from the time code detecting block 56 to the calculation block 59 as the present time TC1. As a result, the calculation block 59 calculates the relative time as follows;

00:00:00−15:00:00=−15:00:00.

Thus, in the conventional magnetic recording and reproducing apparatus, in the case that the non-recording part exists in the magnetic recording medium, the relative time takes a discontinuous value before and after the nonrecording part.

As a result, in the conventional magnetic recording and reproducing apparatus, in the case that the same value of the relative time exists before and after the non-recording part, there is such problem that the operator can not performs an edit ,or a research of the magnetic recording medium with the relative time.

OBJECT AND SUMMARY OF THE INVENTION

The object of the present invention is to provide a magnetic recording and reproducing apparatus that can solve the aforementioned problems.

In order to achieve the above-mentioned object, a magnetic recording and reproducing apparatus in accordance with the present invention comprises:

a time code detecting block for detecting a time code in reproduced signals with a predetermined sampling frequency, the time code detecting block is for successively issuing said time code, a reset position memory for storing the time code at a reset position, a previous time code memory for storing the time code, the time code stored in the previous time code memory is one previous time code to the time code issued from the time code detecting block, a relative time memory for storing a relative time, and a calculation block for calculating a present relative time based upon the time code issued from the time code detecting block, the time code issued from the reset position memory, the time code issued from the previous time code memory, and the relative time issued from the relative time memory, the relative time memory inputting the present relative time calculated by calculation block, and the relative time memory storing the present relative time as the relative time.

According to the above-mentioned magnetic recording and reproducing apparatus of the present invention, a standard time is memorized in the reset position memory, a previous time is memorized in the previous time code memory. Furthermore, the calculation block calculates a differential time between the previous time stored in the previous time code memory and the present time issued from the time code detecting block. Thereby, it is possible to judge continuity of the time code.

Furthermore, in the case that the differential time is a positive value, the calculation block calculates the present relative time by means of subtracting the standard time from the present time. In the case that the differential time is a negative value, the calculation block calculates the present relative time with the differential time and the relative time issued from the relative time memory. Thereby, even if the non-recording part exists in the magnetic recording medium, and the continuity of the time code is lost, it is possible that the relative time takes a continuous value before and after the non-recording part. As a result, it is possible to prevent the same value of the relative time before and after the non-recording part. Therefore, it is possible that the operator performs an edit of the magnetic recording medium with the relative time. Furthermore, it is possible to search the magnetic recording medium with the relative time easily.

While the novel features of the invention are set forth particularly in the appended claims, the invention, both as to organization and content, will be better understood and appreciated, along with other objects and features thereof, from the following detailed description taken in conjunction with the drawings.

DESCRIPTION OF THE PREFERRED EMBODIMENT

Hereafter, a preferred embodiment of the present invention is described with reference to the accompanying drawings.

In the below-mentioned explanation, a time code designates a continuously recording time on a magnetic recording medium such as a video tape, and is used for obtaining a relative time between a reset position and a present running position of the magnetic recording medium.

Figure 1:
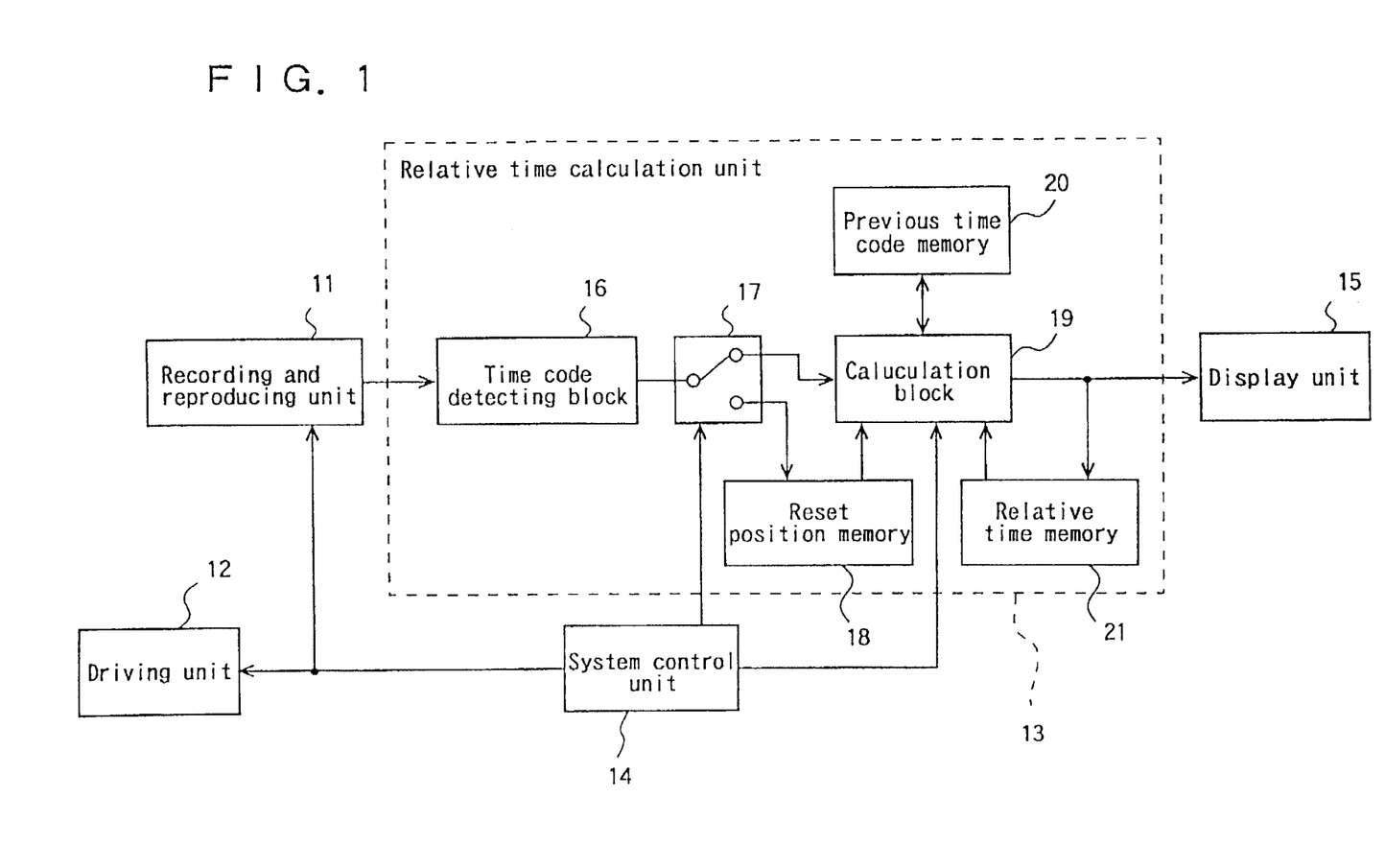
FIG. 1 is a block diagram showing a magnetic recording and reproducing apparatus of the present invention.

FIG. 1 is a block diagram showing a magnetic recording and reproducing apparatus of the present invention.

In FIG. 1, a magnetic recording and reproducing apparatus comprises a recording and reproducing unit 11 having a magnetic head (not shown), a driving unit 12 for driving a magnetic recording medium (not shown), and a relative time calculation unit 13 connected with the recording and reproducing unit 11. Furthermore, the magnetic recording and reproducing apparatus includes a system control unit 14 for controlling the recording and reproducing unit 11, the driving unit 12, and the relative time calculation unit 13, and a display unit 15 for indicating a present relative time calculated by the relative time calculation unit 13. The relative time calculation unit 13 and the system control unit 14 is formed by an LSI.

The recording and reproducing unit 11 records recording signals to the magnetic recording medium, and reproduces reproduced signals from the magnetic recording medium. The recording signals and the reproduced signals include the video signal, the audio signal, and/or the time code. Furthermore, the recording and reproducing unit 11 outputs the reproduced signals to the relative time calculation unit 13. In accordance with demands of an operator such as an user, the recording and reproducing unit 11 and the driving unit 12 are controlled by the system control block 14.

The relative time calculation unit 13 comprises a time code detecting block 16 connected with the recording and reproducing unit 11, a switching block 17 connected with the time code detecting block 16, a reset position memory 18 for storing a time code at the reset position, and a calculation block 19 for calculating the present relative time. Furthermore, the relative time calculation unit 13 includes a previous time code memory 20 for storing the time code issued from the calculation block 19, and a relative time memory 21 for storing a relative time TC3 calculated by the calculation block 19. The time code detecting block 16 detects the time code out of the reproduced signals issued from the recording and reproducing unit 11 at a predetermined sampling period (e.g., 1/30 seconds). Furthermore, the time code detecting block 16 outputs the time code to the switching block 17 in succession. The switching block 17 is controlled by a first switching signal and a second switching signal issued from the system control unit 14. That is, when the switching block 17 inputs the first switching signal, the switching block 17 switches the time code issued by the time code detecting block 16 from the calculation block 19 to the reset position memory 18. Thereby, the time code is memorized in the reset position memory 18 as a standard time TC0 of the relative time. When the switching block 17 inputs the second switching signal, the switching block 17 switches the time code issued by the time code detecting block 16 from the reset position memory 18 to the calculation block 19. Thereby, the time code is issued to the calculation block 19 as a present time TC1 corresponding to the present running position. Furthermore, the time code is issued from the calculation block 19 to the previous time code memory 20, and is memorized in the previous time code memory 20 as a previous time TC2. The system control unit 14 outputs the first switching signal in the following cases (1) and (2), so that the relative time is reset to a predetermined value, for example, "00:00:00" in the display unit 15.

(1) The operator pushes a reset button (not shown) for resetting the relative time.

(2) The operator sets the magnetic recording medium to the magnetic recording and reproducing apparatus newly.

The calculation block 19 calculates the present relative time based upon the standard time TC0, the present time TC1, the previous time TC2, and the relative time TC3 in accordance with demand signals issued from the system control block 14. Furthermore, the calculation block 19 inputs a discontinuous setting signal from the system control unit 14 when the system control unit 14 judges that a non-recording part exists in the magnetic recording medium. The calculation block 19 inputs a release signal from the system control unit 14 when the system control unit 14 judges that a non-recording part does not exist in the magnetic recording medium. Moreover, the calculation block 19 outputs the present relative time to the display unit 15. Thereby, the present relative time is indicated by the display unit 15.

A method of calculating the present relative time in the magnetic recording and reproducing apparatus will be explained with reference to FIG. 2.

Figure 2:
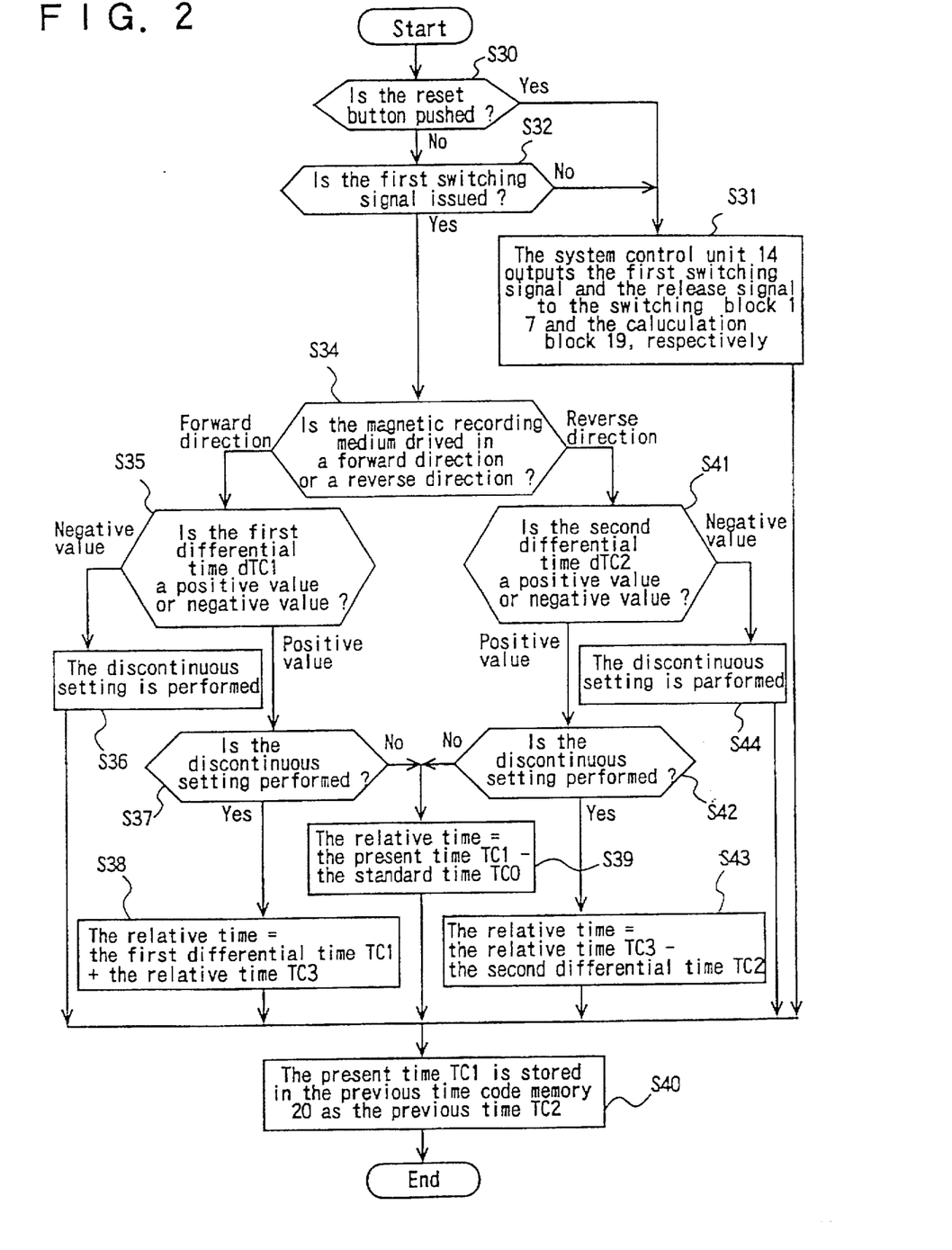
FIG. 2 is a flowchart diagram showing a method of calculating a relative time based upon a time code in the magnetic recording and reproducing apparatus of the present invention.

FIG. 2 is a flowchart diagram showing a method of calculating a relative time based upon a time code in the magnetic recording and reproducing apparatus.

In a step S30, the system control unit 14 (FIG. 1) checks whether the reset button is pushed by the operator. In the case that the reset button is pushed by the operator, the system control unit 14 outputs the first switching signal and the release signal to the switching block 17 (FIG. 1) and the calculation block 19 (FIG. 1), respectively, as shown in a step S31. Thereby, the reset position memory 18 (FIG. 1) is connected with the time code detecting block 16 (FIG. 1) through the switching block 17, and the time code issued from the time code detecting block 16 is stored in the reset position memory 18 as the standard time TC0. Furthermore, in the calculation block 19, a discontinuous setting of the time code is released.

In the case that the reset button is not pushed by the operator, the system control unit 14 checks whether the first switching signal is issued to the switching block 17 as shown in a step S32. In the case that the first switching signal is not issued to the switching block 17, the system control unit 14 judges that the operator sets the magnetic recording medium to the magnetic recording and reproducing apparatus newly. Thereby, the system control unit 14 performs the operation shown in the above-mentioned step S31.

In the case that the first switching signal is issued to the switching block 17, the system control unit 14 judges that the magnetic recording medium is driven by the driving unit 12 (FIG. 1), and the standard time TC0 is stored in the reset position memory 18. Thereby, the system control unit 14 outputs the second signal to the switching block 17. As a result, the time code detecting block 16 is connected with the calculation block 19 through the switching block 17, and the time code is output to the calculation block 19 as the present time TC1.

Furthermore, the system control unit 14 checks whether the magnetic recording medium is driven in a forward direction or a reverse direction by the driving unit 12 as shown in a step S34. In the case that the magnetic recording medium is driven in the forward direction, the system control unit 14 outputs a first demand signal to the calculation block 19. Thereby, the calculation block 19 calculates a first differential time dTC1 by means of subtracting the previous time TC2 stored in the previous time code memory 20 (FIG. 1) from the present time TC1 issued from the time code detecting block 16.

Successively, the system control unit 14 judges whether the first differential time dTC1 is a positive value or a negative value as shown in a step S35. In the case that the first differential time dTC1 is a negative value, the system control unit 14 judges that the non-recording part exists between the reset position and the present running position, and the time code loses it's continuity. Thereby, the system control unit 14 outputs the discontinuous setting signal to the calculation block 19, so that the discontinuous setting of the time code is performed as shown in a step S36. Furthermore, the present time TC1 is stored in the previous time code memory 20 as the previous time TC2 as shown in a step S40.

In the case that the first differential time dTC1 is a positive value, the system control unit 14 judges whether the discontinuous setting of the time code is performed as shown in a step S37. In the case that the discontinuous setting of the time code is not performed, the system control unit judges that the non-recording part does not exist between the reset position and the present running position. Thereby, the calculation block 19 calculates the present relative time by means of subtracting the standard time TC0 from the present time TC1 as shown in a step S39. Furthermore, the calculation block 19 outputs the calculated value (the present relative time) to the display unit 15 as the relative time. At the same time, the calculated value is outputs to the relative time memory 21 (FIG. 1), and is memorized as the relative time TC3.

In the case that the discontinuous setting of the time code is performed, the system control unit 14 judges that the non-recording part exists between the reset position and the present running position. Thereby, the calculation block 19 calculates the present relative time by means of summing the first differential time dTC1 and the relative time TC3 issued from the relative time memory 21 as shown in a step S38. Furthermore, the calculation block 19 outputs the calculated value (the present relative time) to the display unit 15 as the relative time. At the same time, the calculated value is outputs to the relative time memory 21, and is memorized as the relative time TC3.

In the case that the magnetic recording medium is driven in the reverse direction, the system control unit 14 outputs a second demand signal to the calculation block 19. Thereby, the calculation block 19 calculates a second differential time dTC2 by means of subtracting the present time TC1 issued from the time code detecting block 16 from the previous time TC2 stored in the previous time code memory 20.

Successively, the system control unit 14 judges whether the second differential time dTC2 is a positive value or a negative value as shown in a step S41.

In the case that the second differential time dTC2 is a negative value, the system control unit 14 judges that the non-recording part exists between the reset position and the present running position, and the time code loses it's continuity. Thereby, the system control unit 14 outputs the discontinuous setting signal to the calculation block 19, so that the discontinuous setting of the time code is performed as shown in a step S44. Furthermore, the present time TC1 is stored in the previous time code memory 20 as the previous time TC2 as shown in a step S40.

In the case that the second differential time dTC2 is a positive value, the system control unit 14 judges whether the discontinuous setting of the time code is performed as shown in a step S42. In the case that the discontinuous setting of the time code is not performed, the system control unit judges that the non-recording part does not exist between the reset position and the present running position. Thereby, the calculation block 19 calculates the present relative time by means of subtracting the standard time TC0 from the present time TC1 as shown in a step S39. Furthermore, the calculation block 19 outputs the calculated value (the present relative time) to the display unit 15 as the relative time. At the same time, the calculated value is outputs to the relative time memory 21, and is memorized as the relative time TC3.

In the case that the discontinuous setting of the time code is performed, the system control unit 14 judges that the non-recording part exists between the reset position and the present running position. Thereby, the calculation block 19 calculates the present relative time by means of subtracting the second differential time dTC2 from the relative time TC3 issued from the relative time memory 21 as shown in a step S43. Furthermore, the calculation block 19 outputs the calculated value (the present relative time) to the display unit 15 as the relative time. At the same time, the calculated value is outputs to the relative time memory 21, and is memorized as the relative time TC3.

The operation of the magnetic recording and reproducing apparatus will be explained with reference to FIG. 3A and FIG. 3B concretely.

Figure 3A:
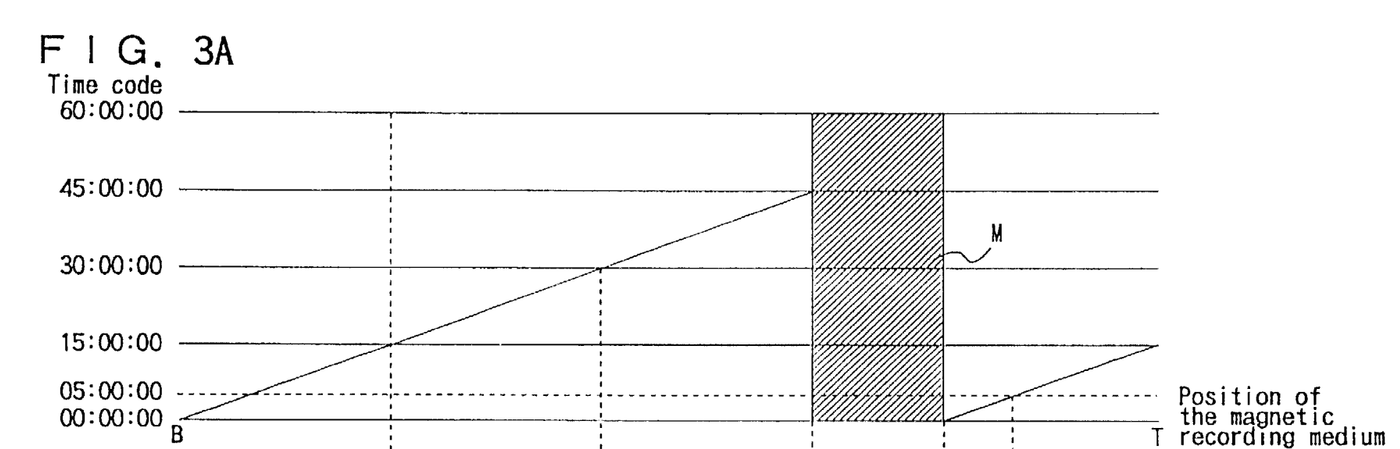
FIG. 3A is a time chart showing a relation between the time code and a position of the magnetic recording medium in the magnetic recording and reproducing apparatus of the present invention.

FIG. 3A is a time chart showing a relation between the time code and a position of the magnetic recording medium in the magnetic recording and reproducing apparatus of the present invention. FIG. 3B is a time chart showing a relation between the relative time and the position of the magnetic recording medium in the magnetic recording and reproducing apparatus of the present invention. In FIG. 3A, the abscissa is graduated with a position of the magnetic recording medium, and the ordinate is graduated with the time code. In FIG. 3B, the abscissa is graduated with a position of the magnetic recording medium, and the ordinate is graduated with the relative time. In the respective abscissas of FIGS. 3A and 3B, a point "B" designates a beginning end of the magnetic recording medium, and a point "T" designates a terminal end of the magnetic recording medium. In FIGS. 3A and 3B, a shaded portion "M" designates a non-recording part of the magnetic recording medium. FIG. 3A and FIG. 3B are drawn with their timing positions (represented by vertical broken lines) in agreement with each other.

In the below-mentioned explanation, the magnetic recording medium is driven in the forward direction by the driving unit 12 (FIG. 1).

Figure 3B:
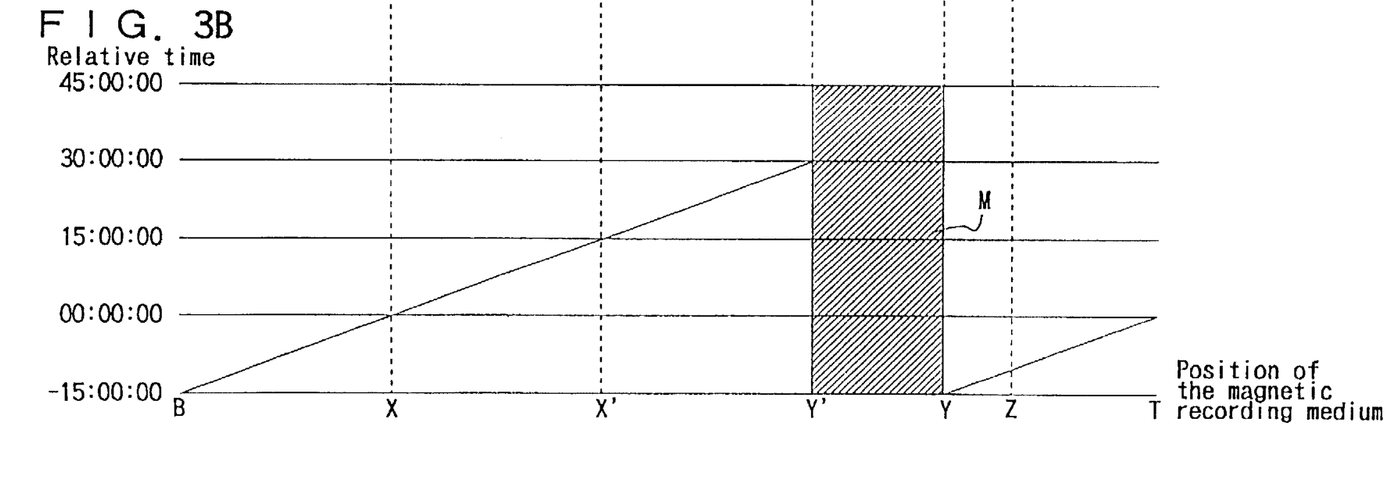
FIG. 3B is a time chart showing a relation between the relative time and the position of the magnetic recording medium in the recording and reproducing apparatus of the present invention.

For example, in FIGS. 3A and 3B, when the first switching signal is issued from the system control unit 14 (FIG. 1) to the switching block 17 (FIG. 1) at a point "X", the time code "15:00:00" is memorized in the reset position memory 18 (FIG. 1) as the standard time TC0. In the above-mentioned state, when the position of the magnetic recording medium exists in a point "X", the time code "30:00:00" outputs from the time code detecting block 16 (FIG. 1) to the calculation block 19 (FIG. 1) as the present time TC1. As a result, the calculation block 19 calculates the present relative time as follows;

30:00:00−15:00:00=15:00:00.

Furthermore, in the above-mentioned state, when the position of the magnetic recording medium exists in a point "Y", the time code "00:00:00" outputs from the time code detecting block 16 to the calculation block 19 as the present time TC1. Besides, the previous time code memory 20 (FIG. 1) memorizes the time code "45:00:00" at a point "Y" as the previous time TC2. Therefore, the first differential time dTC1 is a negative value (step S35). Accordingly, the system control unit 14 judges that the non-recording part exists between the reset position and the present running position. Furthermore, the system control block 14 outputs the discontinuous setting signal to the calculation block 19, so that the discontinuous setting of the time code is performed (step S36). Thereafter, the present time TC1 is stored in the previous time code memory 20 as the previous time TC2 (step S40). At the same time, the calculation block 19 calculates the present relative time at the point "Y" as follows;

45:00:00−15:00:00=30:00:00.

When the time code at a point "Z" is detected by the time code detecting block 16 in a succession to the point "Y", the time code "05:00:00" outputs from the time code detecting block 16 to the calculation block 19 as the present time TC1. Besides, the previous time code memory 20 memorizes the time code "00:00:00" at a point "Y". Therefore, the first differential time dTC1 is calculated as follows;

05:00:00−00:00:00=05:00:00 (step S35).

Since the discontinuous setting of the time code is performed, the calculation block 19 calculates the present relative time at the point "Z" as follows;

30:00:00−05:00:00=35:00:00 (step S38).

Thus, in the magnetic recording and reproducing apparatus of the present invention, the standard time TC0 is memorized in the reset position memory 18, the previous time TC2 is memorized in the previous time code memory 20. Furthermore, the calculation block 19 calculates the first differential time dTC1 by means of subtracting the previous time TC2 stored in the previous time code memory 20 from the present time TC1 issued from the time code detecting block 16. Thereby, it is possible to judge continuity of the time code (step S35).

Furthermore, in the case that the continuity of the time code is detected, the calculation block 19 calculates the present relative time by means of subtracting the standard time TC0 from the present time TC1 (step S39). In the case that the discontinuity of the time code is detected, the calculation block 19 calculates the present relative time by means of summing the first differential time dTC1 and the relative time TC3 issued from the relative time memory 21 (step S38). Thereby, even if the non-recording part exists in the magnetic recording medium, and the continuity of the time code is lost, it is possible that the relative time takes a continuous value before and after the non-recording part. As a result, it is possible to prevent the same value of the relative time before and after the non-recording part. Therefore, it is possible that the operator performs an edit of the magnetic recording medium with the relative time. Furthermore, it is possible to easily search the magnetic recording medium with the relative time.

Although the present invention has been described in terms of the presently preferred embodiments, it is to be understood that such disclosure is not to be interpreted as limiting. Various alterations and modifications will no doubt become apparent to those skilled in the art to which the present invention pertains, after having read the above disclosure. Accordingly, it is intended that the appended claims be interpreted as covering all alterations and modifications as fall within the true spirit and scope of the invention.

What is claimed is:

1. A magnetic recording and reproducing apparatus comprising:

a time code detecting block for detecting a time code out of reproduced signals at a predetermined sampling period, said time code detecting block being for successively issuing said time code, a reset position memory for storing said time code at a reset position, a previous time code memory for storing said time code, said time code stored in said previous time code memory being one previous time code to said time code issued from said time code detecting block, a relative time memory for storing a relative time, and a calculation block for calculating a present relative time based upon said time code issued from said time code detecting block, said time code issued from said reset position memory, said time code issued from said previous time code memory, and said relative time issued from said relative time memory, said relative time memory inputting said present relative time calculated by calculation block, and said relative time memory storing said present relative time as said relative time.

2. A method of calculating a present relative time in a magnetic recording and reproducing apparatus, said method comprising the steps of:

detecting a time code in reproduced signals at a predetermined sampling period by a time code detecting block, storing said time code at a reset position in a reset position memory, calculating a differential time between two of said time codes successively issued from said time code detecting block by a calculation block, storing a relative time calculated by said calculation block in a relative time memory, detecting discontinuity of said time code in accordance with said differential time and a running direction of a magnetic recording medium driven by a driven unit, and calculating a present relative time by means of subtracting a standard time stored in said reset position memory from a present time issued from said time code detecting block when said discontinuity is not detected, calculating a present relative time by adding said differential time and said relative time issued from said relative time memory when said discontinuity is detected.

* * * * *

UNITED STATES PATENT AND TRADEMARK OFFICE
CERTIFICATE OF CORRECTION

PATENT NO. : 5,768,042
DATED      : June 16, 1998
INVENTOR(S) : Atsushi Hashimoto It is certified that error appears in the above-indentified patent and that said Letters Patent is hereby corrected as shown below:

N THE DRAWINGS:

ig. 2: In the block labeled S38, "TC1" should be changed to read --dTC1--.

ig. 2: In the block labeled S43, "TC2" should be changed to read --dTC2--.

Signed and Sealed this

Twentieth Day of October, 1998

Attest:

BRUCE LEHMAN

*Attesting Officer*    *Commissioner of Patents and Trademarks*